United States Patent
Ono

(10) Patent No.: US 7,505,676 B2
(45) Date of Patent: Mar. 17, 2009

(54) INFORMATION REPRODUCING METHOD AND INFORMATION REPRODUCING DEVICE

(75) Inventor: Kenichiro Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 11/039,784

(22) Filed: Jan. 24, 2005

(65) Prior Publication Data

US 2005/0169610 A1   Aug. 4, 2005

(30) Foreign Application Priority Data

Feb. 3, 2004   (JP)   ............... 2004-026648

(51) Int. Cl.
*H04N 7/00* (2006.01)
*H04N 5/91* (2006.01)

(52) U.S. Cl. ............... 386/95; 386/65; 386/66

(58) Field of Classification Search ............ 386/66, 386/68, 95, 125, 65
See application file for complete search history.

(56) References Cited

U.S. PATENT DOCUMENTS

| 2002/0085123 A1 | 7/2002 | Ono | ............... 348/584 |
|---|---|---|---|
| 2002/0156602 A1 | 10/2002 | Kunii et al. | ............... 702/188 |
| 2004/0039575 A1* | 2/2004 | Bum | ............... 704/500 |
| 2004/0158874 A1 | 8/2004 | Ono et al. | ............... 725/131 |
| 2006/0184969 A1 | 8/2006 | Yamamoto et al. | ............ 725/58 |

FOREIGN PATENT DOCUMENTS

| EP | 1 622 153 A1 | 2/2006 |
|---|---|---|
| JP | 2002-262208 | 9/2002 |
| JP | 2002-262220 | 9/2002 |
| WO | WO 2004/084222 | 9/2004 |

OTHER PUBLICATIONS

Xilinx, Application Note: Design of an MP3 Portable Player Using a CoolRunner CPLD, Mar. 7, 2000, XAPP328(v1.2).*

* cited by examiner

*Primary Examiner*—Thai Tran
*Assistant Examiner*—Hung Q Dang
(74) *Attorney, Agent, or Firm*—Fitzpatrick, Cella, Harper & Scinto

(57) ABSTRACT

An information reproducing method using a first information reproducing device and a second information reproducing device that can conduct communications with each other via wireless or wired communication means, the method including: a storage step of storing reproduction information which represents a state of reproduction of a content in the second device in a state where the second device is disconnected from the first device; and a transmission step of transmitting the reproduction information from the second device to the first device after the storage step in a state where the first device and the second device are connected to each other to conduct communications with each other, wherein the content stored in the first device is reproduced on the basis of the transmitted reproduction information.

6 Claims, 12 Drawing Sheets

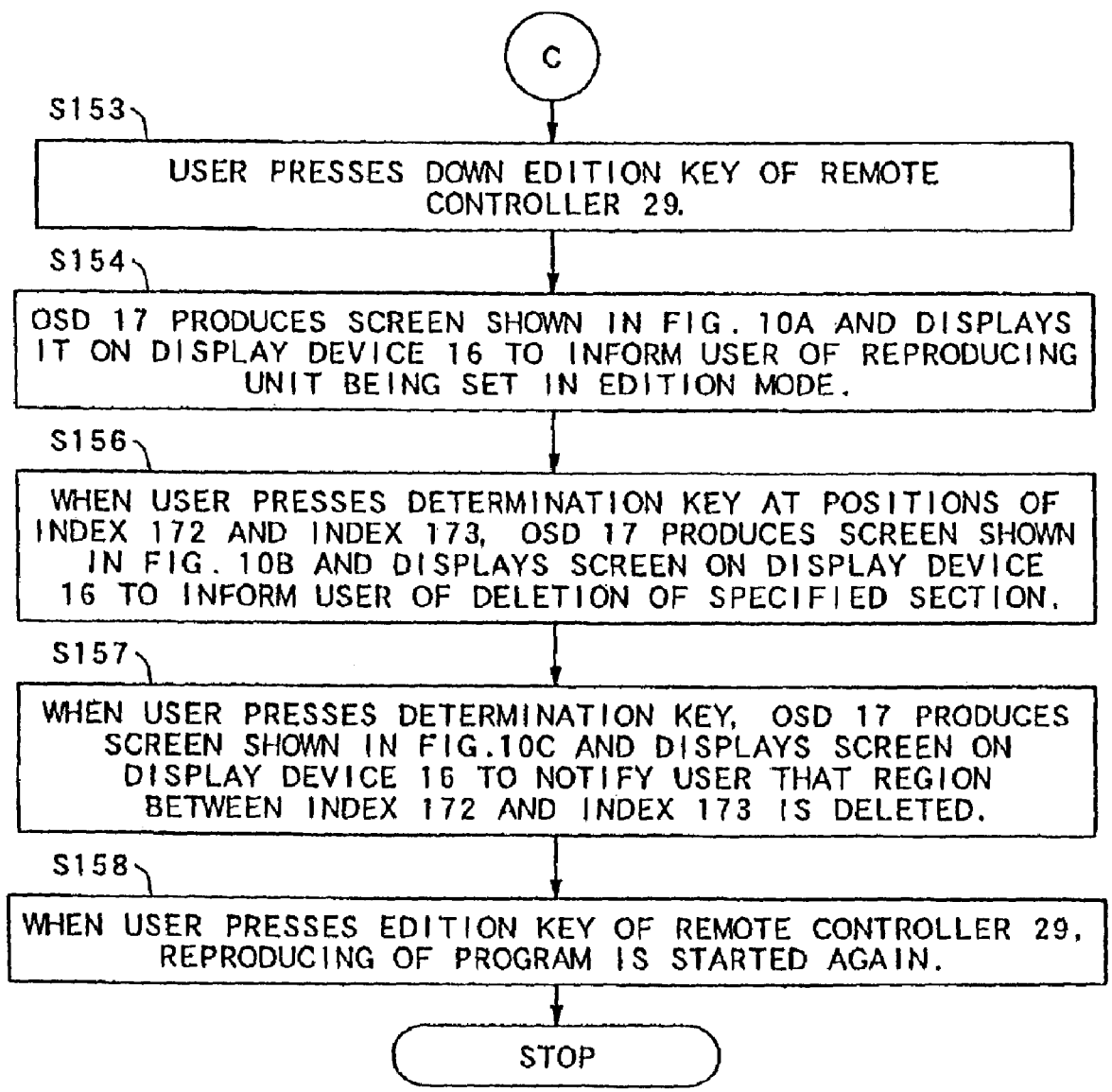

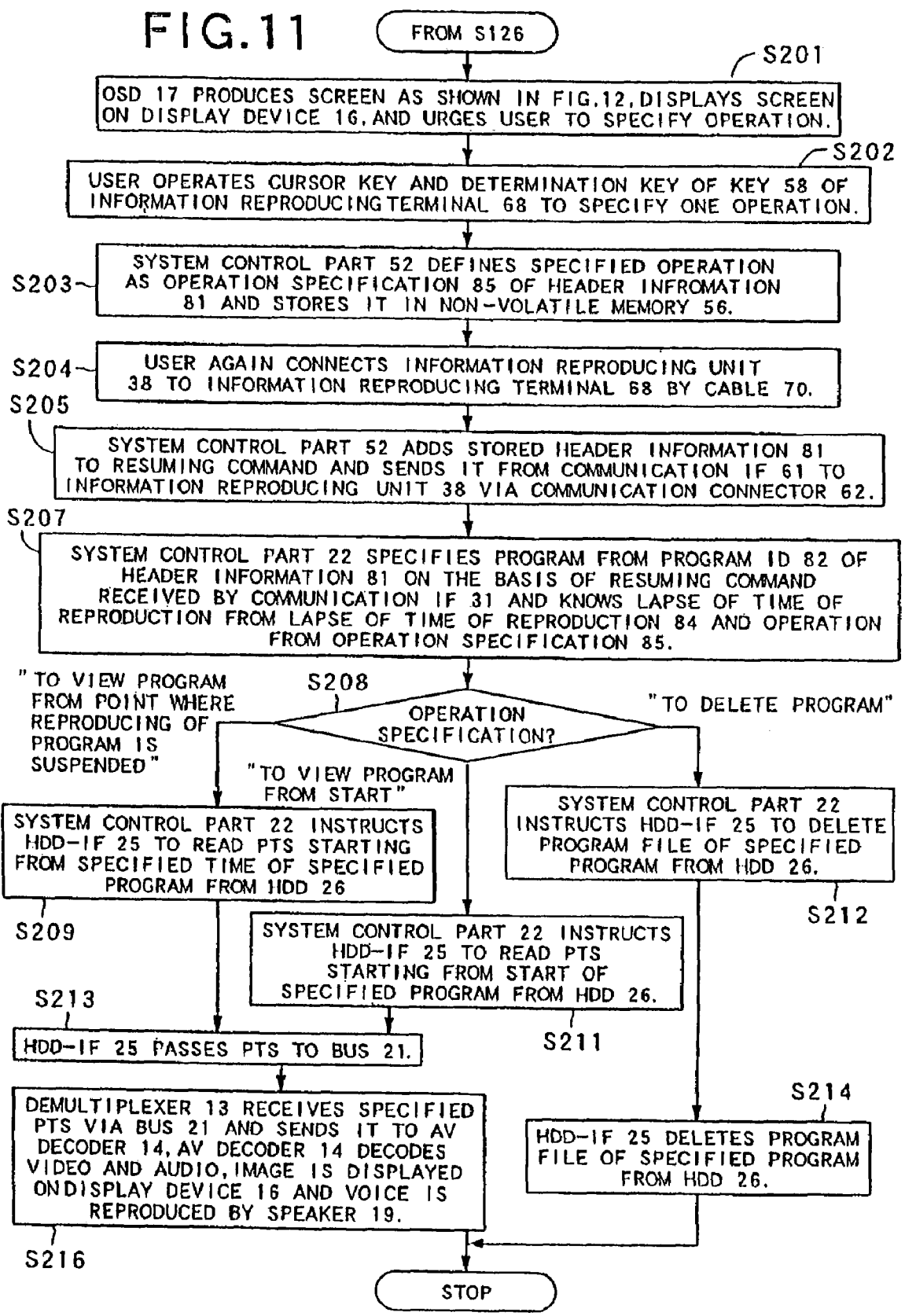

INFORMATION REPRODUCING METHOD AND INFORMATION REPRODUCING DEVICE

BACKGROUND OF THE INVENTION

1. Field of the Invention

The present invention relates to an information reproducing method, an information reproducing device, and an information reproducing terminal for reproducing information with a device and a terminal.

2. Description of the Related Art

In recent years, attention has been given to the variety of television broadcasts. In addition to a conventional CS (Communication Satellite) broadcast using communication satellites, a BS (Broadcast Satellite) digital broadcast and a wideband CS broadcast (so-called 110° CS broadcast) started to increase the number of channels and the number of programs that viewers could select. A digital terrestrial television broadcast is scheduled to be started in the future, so it is expected that the number of programs will increase more and more.

On the other hand, as for recording devices for recording programs, in addition to conventional devices using video tapes, recording type DVDs, hard disc drives (HDD), and devices using a large-capacity nonvolatile memory are expected to be put on the market one after another.

However, most viewers worry that even when the number of television programs they want to view increases, they cannot make enough time for viewing the television programs. For this reason, the need for recording a television program in a portable unit and viewing the program in free time at a favorite place is increasing in recent years.

Japanese Patent Laid-Open No. 2002-26222 discloses a recording/reproducing device to be connected to a portable information terminal, comprising means for converting a file for the potable information terminal and means for transmitting a file to the portable information terminal. Further, Japanese Patent Application Laid-Open No. 2002-262200 (USAA 2002156602) discloses a portable information terminal connected to a recording/reproducing device, comprising means for transmitting reservation information and program information to the portable information terminal.

However, the use of transferring a file from a recording/reproducing device to a portable information terminal and reproducing the file in the portable information terminal cannot respond to the use of viewing a part of a certain program by one device and then viewing the remaining part of the program by the other device.

SUMMARY OF THE INVENTION

The invention has been made to solve the above-described problem of the prior art. An object of the invention is to provide an information reproducing method, an information reproducing device, and an information reproducing terminal for improving operability at the time of reproducing information by sharing operation information in the information reproducing device and the information reproducing terminal each of which has a storage part.

A first aspect of the present invention is an information reproducing method using a first information reproducing device and a second information reproducing device that can conduct communications with each other via wireless or wired communication means, the method comprising: a storage step of storing reproduction information which represents a state of reproduction of a content in the second information reproducing device in a state where the second information reproducing device is disconnected from the first information reproducing device; and a transmission step of transmitting the reproduction information from the second information reproducing device to the first information reproducing device after the storage step in a state where the first information reproducing device and the second information reproducing device are connected to each other to conduct communications with each other, wherein the content stored in the first information reproducing device is reproduced on the basis of the transmitted reproduction information.

Moreover, a second aspect of the present invention is an information reproducing device that can conduct communications with another information reproducing device via wireless or wired communication means, the information reproducing device comprising: a reproduction information receiving part for receiving reproduction information which represents a state of reproduction of a content from the another information reproducing device, wherein the content stored in the storage part is reproduced on the basis of the received reproduction information.

Moreover, a third aspect of the present invention is an information reproducing device that can conduct communications with another information reproducing device via wireless or wired communication means, the information reproducing device comprising: a reproduction information storing part for storing reproduction information which represents a state of reproduction of a content; and a reproduction information transmitting part for transmitting the reproduction information to the another information reproducing device.

Moreover, a fourth aspect of the present invention is an information reproducing method using an information reproducing device capable of conducting communications with another information reproducing device via wireless or wired communication means, the method comprising: a reproduction information receiving step of receiving reproduction information which represents a state of reproduction of a content from the another information reproducing device; and a reproduction controlling step of reproducing the content on the basis of the received reproduction information.

Moreover, a fifth aspect of the present invention is an information reproducing method using an information reproducing device capable of conducting communications with another information reproducing device via wireless or wired communication means, the method comprising: a reproduction information storing step of storing reproduction information which represents a state of reproduction of a content; and a reproduction information transmitting step of transmitting the reproduction information to the another information reproducing device. The invention can improve operability at the time of reproducing information by sharing operational information in the information reproducing device and the information reproducing terminal each of which has a storage part.

BRIEF DESCRIPTION OF THE DRAWINGS

FIG. 9 is a flow chart according to the second embodiment.

FIG. 11 is a flow chart according to a third embodiment of the invention.

DETAILED DESCRIPTION OF THE PREFERRED EMBODIMENTS

Preferred embodiments of this invention will be hereafter described as examples in detail with reference to the drawings. However, it is not intended to limit the scope of this invention only to the sizes, materials, shapes, and relative positions of constituent parts described in these embodiments unless otherwise specified.

First Embodiment

Figure 2:
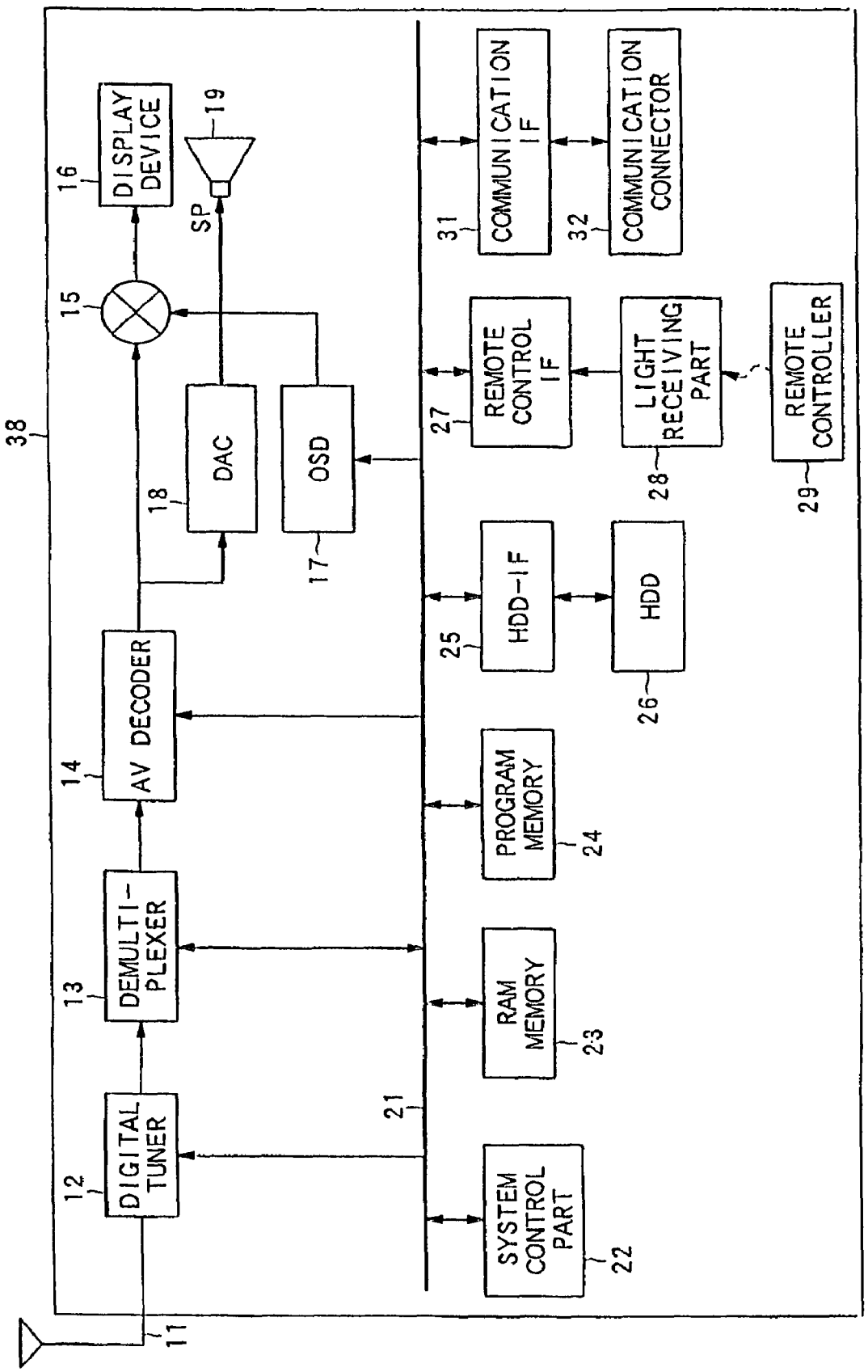
FIG. 2 is a block diagram of the information reproducing unit.

FIG. 2 is a block diagram of an information reproducing unit 38 to which the invention is applied and which can receive a digital broadcast and record and reproduce images. The information reproducing unit 38 is one information reproducing device. In addition, the information reproducing device is one chassis and is composed as a unit which can move independently.

Reference numeral 22 denotes a system control part for controlling the entire unit and 21 denotes a common bus for connecting the system control part 22 to respective control circuits. A RAM memory 23 is used as a work memory of the system control part 22 and a program memory 24 is used for storing programs of the system control part 22.

A signal from a digital tuner 12 that receives a digital broadcast wave from an antenna 11 and selects a desired frequency according to an instruction from the system control part 22 generates digital data of a form called transport stream.

Next, the digital data is sent to a demultiplexer 13 where a program number, a PID value, and stream type contents in the time-division multiplexing transport stream can be made clear by use of PAT (Program Association Table) and PMT (Program Map Table) in PSI (Program Specific Information). The demultiplexer 13 selects a desired video/audio stream and outputs it to an AV decoder 14.

At the same time, the demultiplexer 13 passes partial transport stream (hereinafter abbreviated as PTS) constructed of only streams necessary for a program to be recorded to the bus 21. On the contrary, the multiplexer 13 can also demultiplex PTS flowing through the bus 21 to make a video/audio stream and deliver it to the AV decoder 14.

As for the video stream, videos of MPEG2 are decoded and converted to non-compressed moving video data by the AV decoder 14.

A combination circuit 15 combines moving video data with an OSD video signal from an OSD 17, which will be described later, to form a video and the video is displayed on a display device 16. As for audio stream from the demultiplexer 13, voices of MPEG2 are decoded and converted to non-compressed audio data by the AV decoder 14 and the non-compressed audio data is converted to an analog signal by a digital/analog converter 18 and voice is emitted by a speaker 19.

An HDD-IF 25 can record in an HDD 26 a PTS-form program passed to the bus 21 according to an instruction from the system control part 22 and can reproduce a program recorded by the HDD 26 and pass it in PTS form to the bus 21. In this embodiment, the HDD 26 constructs a storage part and a reproduction information storing part.

A user operates a remote controller 29 emitting infrared rays to instruct the information reproducing unit 38 to switch channels and to record images. A receiving part 28 receives infrared rays from the remote controller 29 and a remote control IF 27 transmits the received signal as data to the common bus 21.

A communication IF 31 can transmit a PTS-form program passed to the bus 21 to an information reproducing terminal 68 via a communication connector 32 and, on the contrary, can receive a PTS-form program from the information reproducing terminal 68.

Further, a communication IF 31 transmits or receives a command (to be described later) to or from the information reproducing terminal 68 according to an instruction from the system control part 22. Communication between the information reproducing unit 38 and the information reproducing terminal 68 is bidirectionally conducted and is high-speed communication in which not only the command but also PTS-form program data can be transmitted and received. In this embodiment, the communication IF 31 is constructed with a reproduction information receiving part and a reproduction information transmitting part.

The OSD 17 produces a screen such as a menu according to an instruction from the system control part 22 and transfers the screen to the combination circuit 15.

Figure 3:
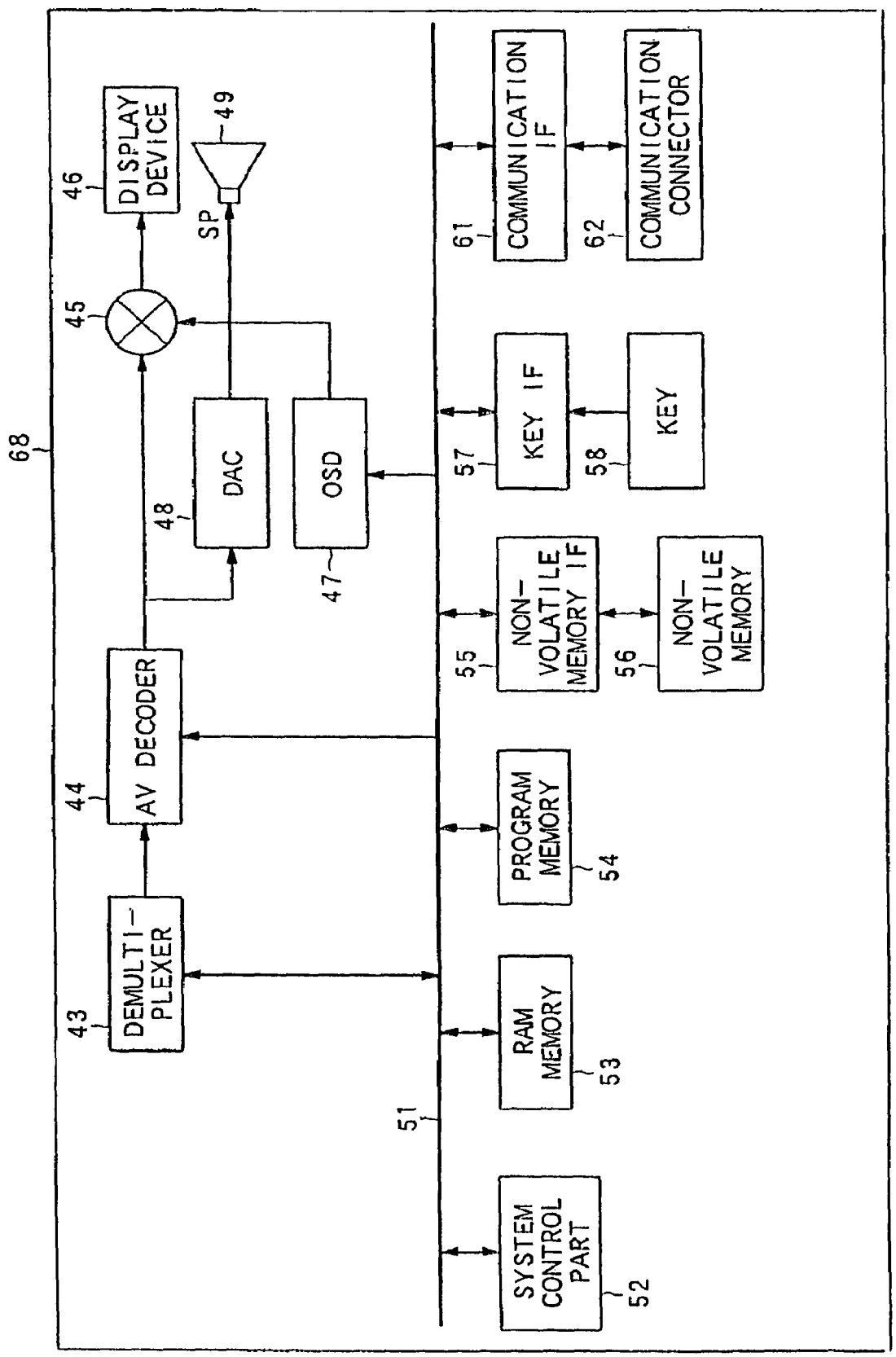
FIG. 3 is a block diagram of the information reproducing terminal.

FIG. 3 is a block diagram of the information reproducing terminal 68 to which the invention is applied and which can record and reproduce images. The information reproducing terminal 68 is one information reproducing device.

Reference numeral 52 denotes a system control part for controlling the entire unit and 51 denotes a common bus for connecting the system control part 52 and respective control circuits. A RAM memory 53 is used as a work memory of the system control part 52 and a program memory 54 is used for storing programs of the system control part 52.

A user operates a key 58 to instruct the information reproducing terminal 68 to reproduce information and the like. A key IF 57 transmits a signal from the key 58 as data to the common bus 51.

A communication IF 61 can receive a PTS-form program from the information reproducing unit 30 via a communication connector 62 and can pass the program to the bus 51 and, on the contrary, can transmit the program to the information reproducing unit 38. Further, the communication IF 61 transmits or receives a command (to be described later) to or from the information reproducing unit 38 according to an instruction from the system control part 52. In this embodiment, the communication IF 61 is constructed with a reproduction information receiving part and a reproduction information transmitting part.

A non-volatile memory IF 55 can record in a non-volatile memory 56 a PTS-form program passed to the bus 51 and, on the contrary, can reproduce the program recorded in the non-volatile memory 56 and pass the program in a PTS form to the bus 51 according to an instruction from the system control part 52. In this embodiment, the non-volatile memory 56 is constructed with a storage part and a reproduction information storing part.

A demultiplexer 43 demultiplexes PTS on the bus 51 to form video/audio stream and transmits the video/audio stream to an AV decoder 44. As for the video stream, videos of MPEG2 are decoded and converted to non-compressed moving video data by the AV decoder 44.

A combination circuit 45 combines the moving video data with an OSD video signal from an OSD 47 to be described later and displays the video on a display device 46. As for the audio stream from the demultiplexer 43, voices of MPEG2 are decoded and converted to non-compressed audio data by the AV decoder 44 and the non-compressed audio data is converted to an analog signal by a digital/analog converter 48 and voice is emitted from a speaker 49.

The OSD 47 produces a screen such as a menu according to an instruction from the system control part 52 and transfers the screen to the combination circuit 45.

Figure 4:
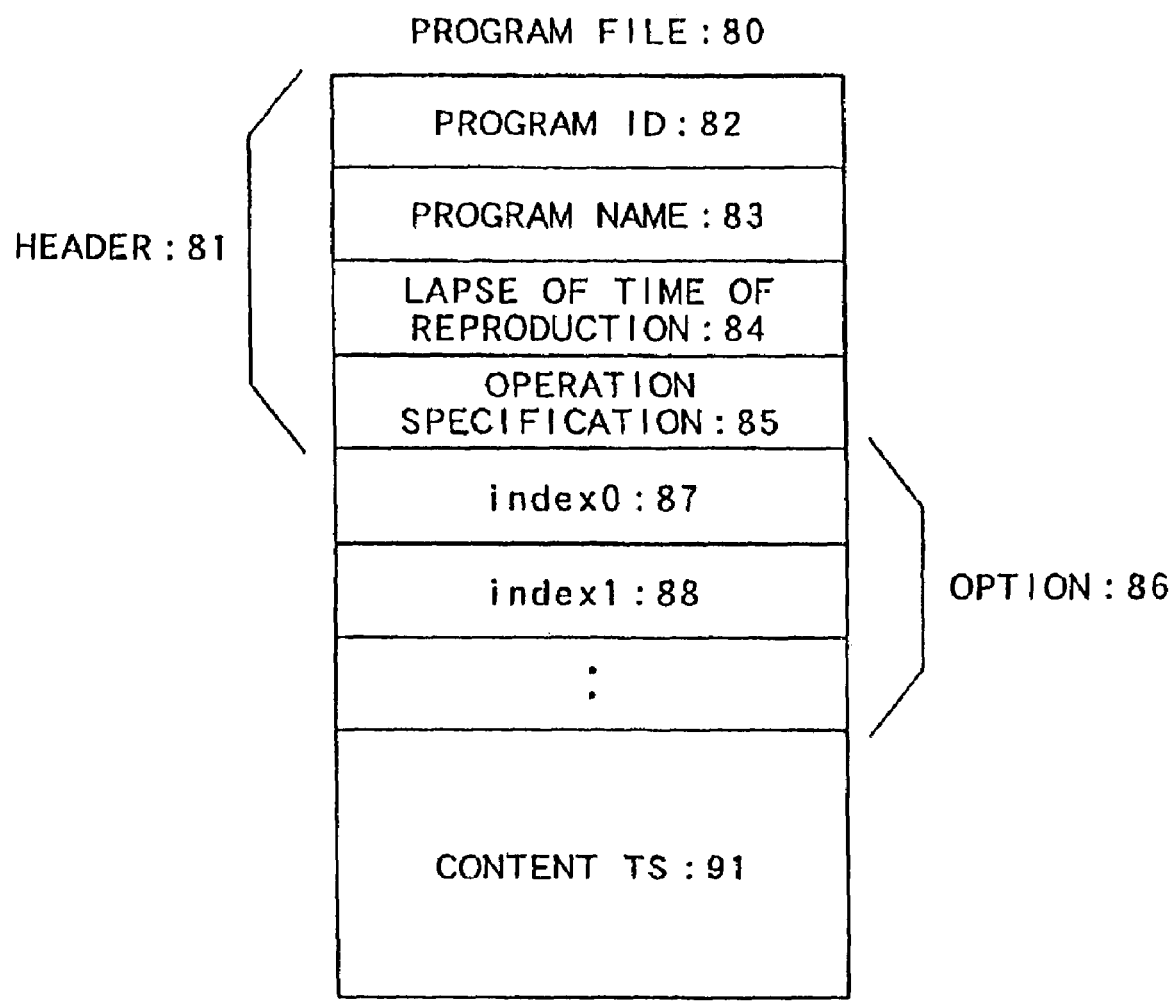
FIG. 4 is a program file.

In FIG. 4 is shown the structure of a program file 80 which is a program format of one program stored in the HDD 26 or the non-volatile memory 56. The program file 80 is divided into a header part 81 for recording program information, an option part 86 for recording option information, and a content TS part 91 for recording program contents in the PTS form.

The header part 81 includes a program ID 82 for determining a program included in the PSI of a digital broadcast, a program name 83 of a program name included similarly in the PSI, a lapse of time of reproduction 84 to show a cumulative reproducing time when a program is reproduced, and an operation specification 85. When a program is recorded, the value of the lapse of time of reproduction 84 is "0". The operation specification 85 and the option part 86 will be described later. In this embodiment, contents include the content TS part 91. Further, storage operation information related to the contents includes the program ID 82, the program name 83, the lapse of time of reproduction 84, the operation specification 85, and the option part 86. Still further, the reproduction information of the contents includes the lapse of time of reproduction 84, the operation specification 85, and the option part 86.

Figure 1:
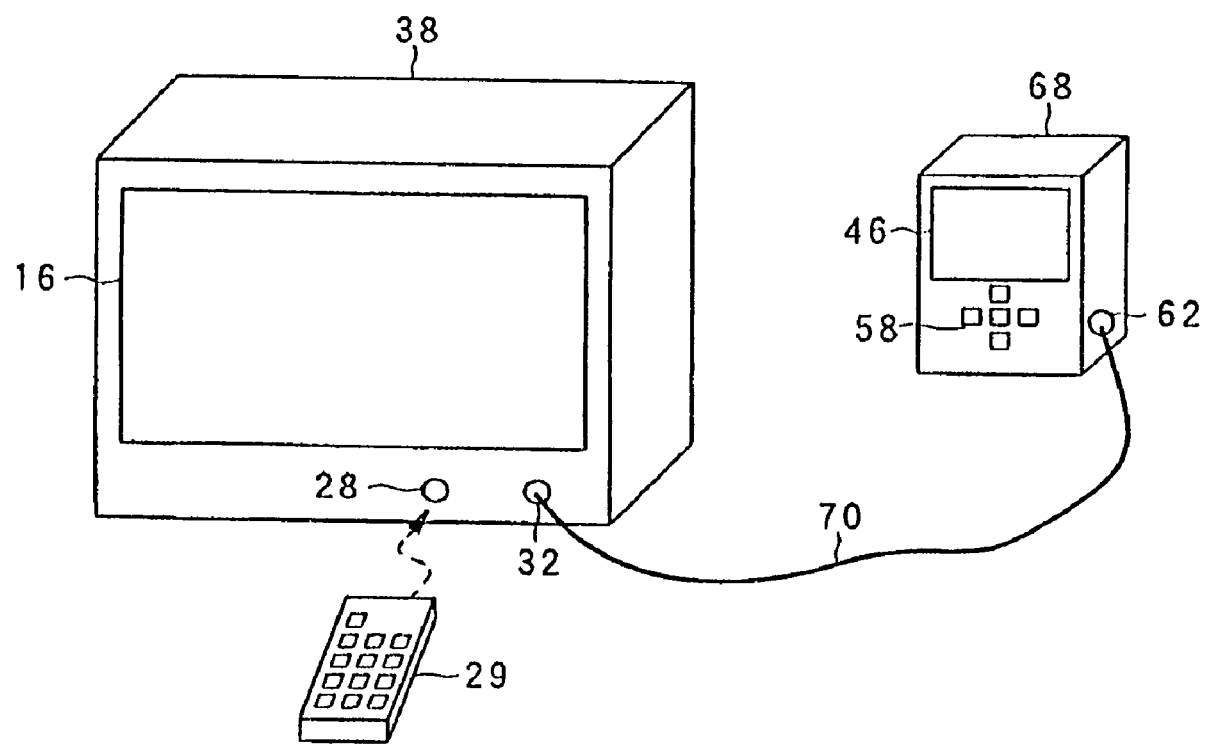
FIG. 1 shows a connection between an information reproducing unit and an information reproducing terminal.

In FIG. 1 is shown a state where the information reproducing unit 38 is connected to the information reproducing terminal 68 by a cable 70 via communication connectors 32, 62.

Figure 5:
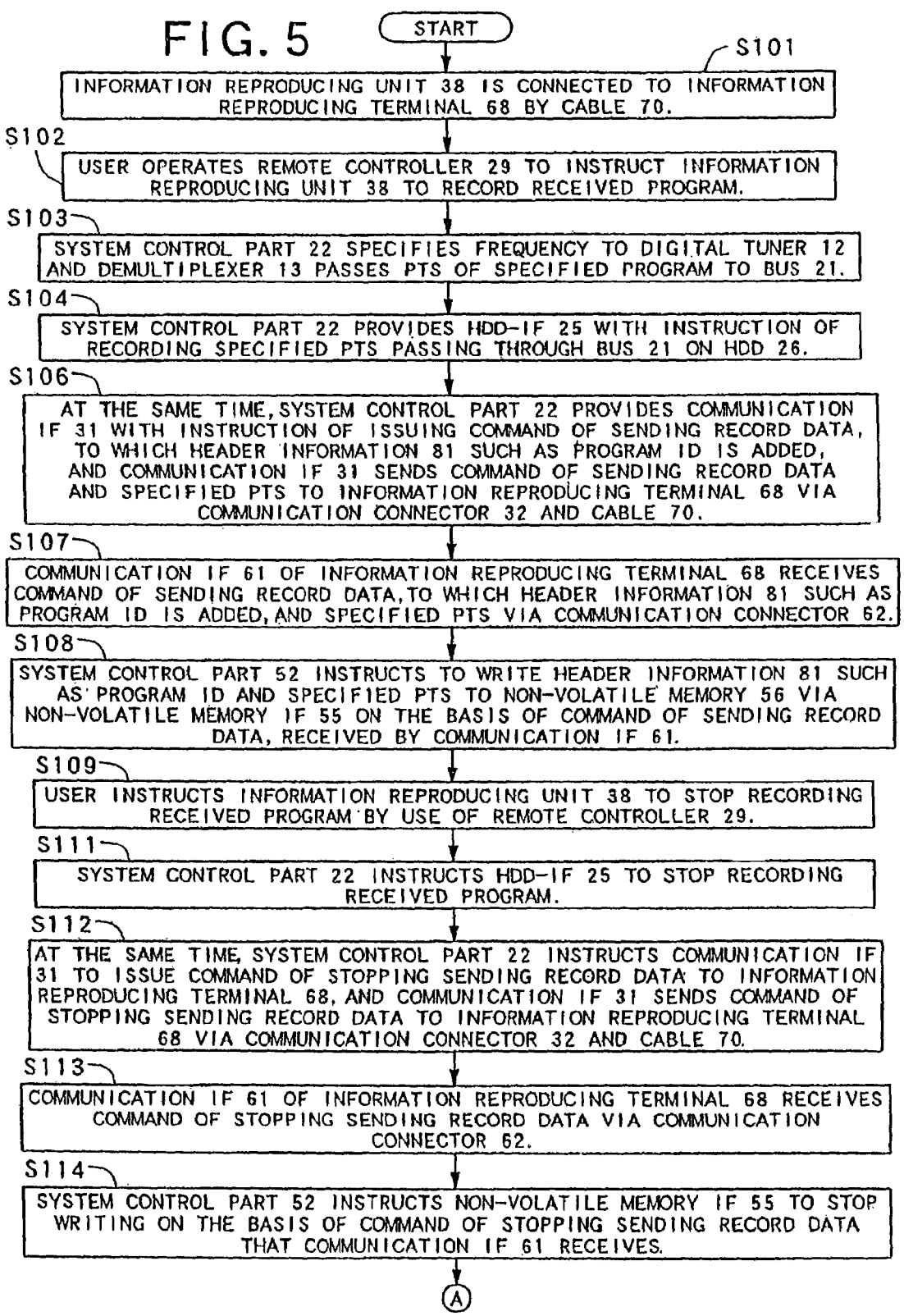
FIG. 5 is a flow chart according to a first embodiment of the invention.
Figure 6:
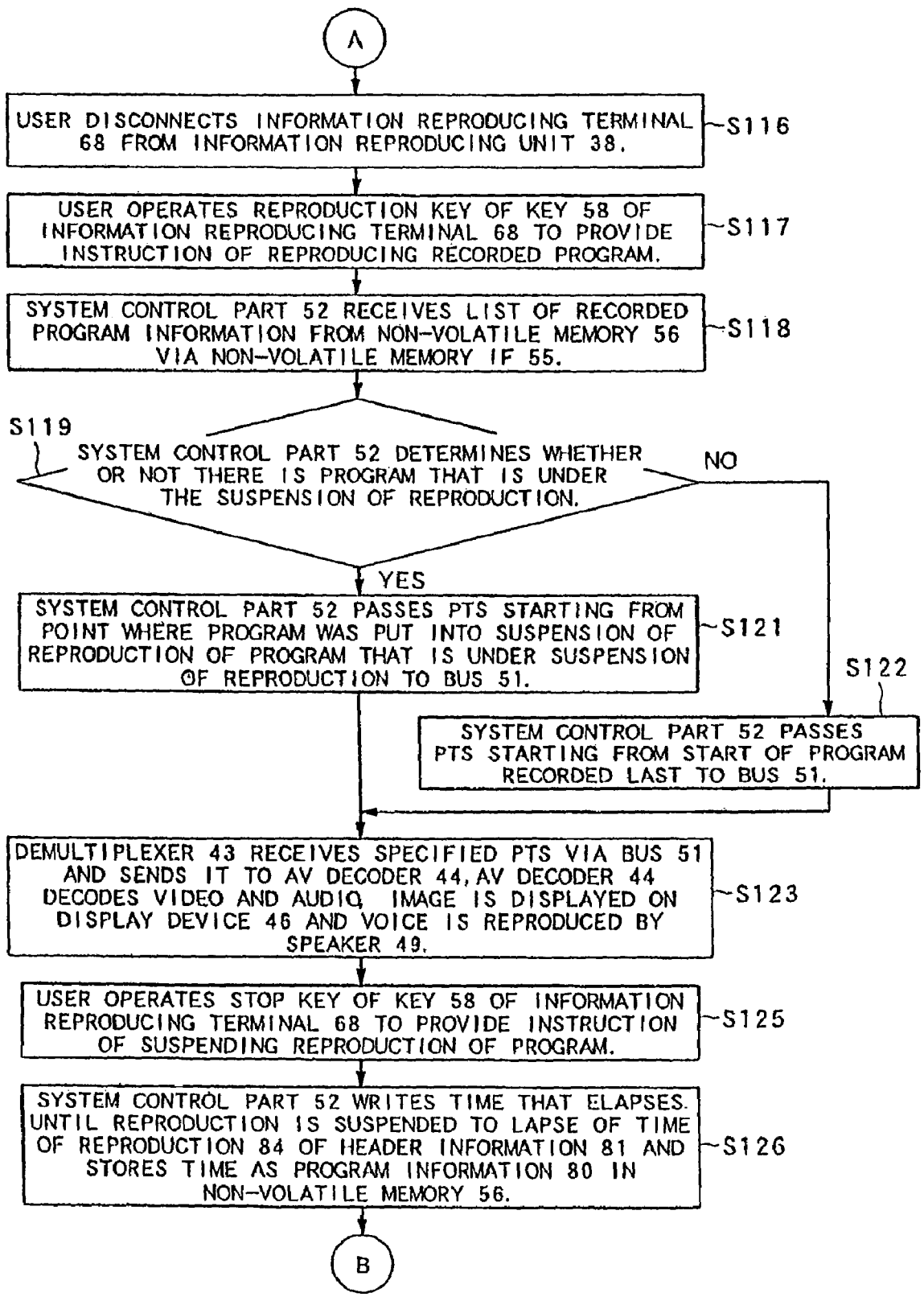
FIG. 6 is a flow chart according to the first embodiment.
Figure 7:
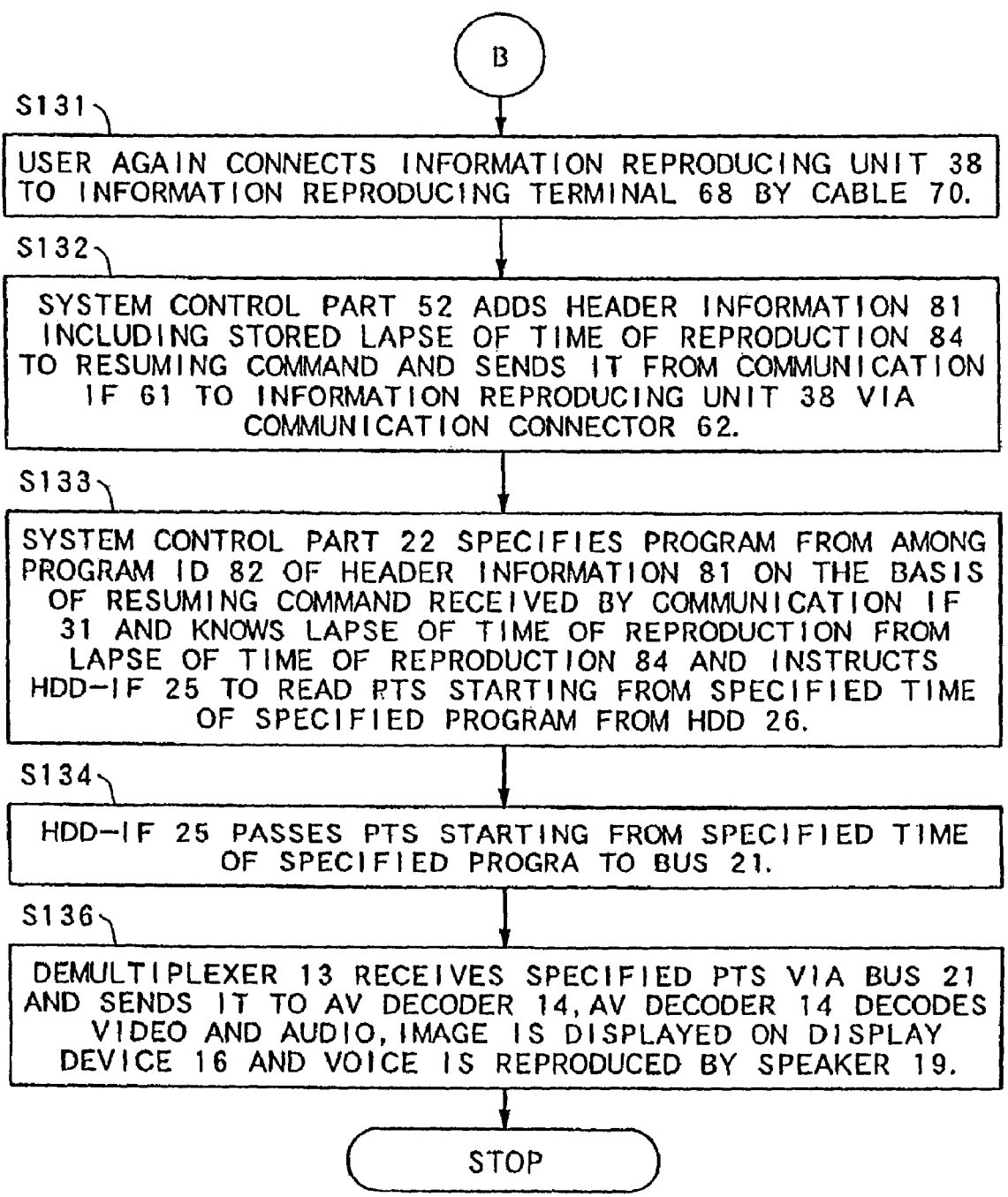
FIG. 7 is a flow chart according to the first embodiment.

In FIGS. 5 to 7, the operations of the information reproducing unit 38 and the information terminal 68 are shown by a flow chart. First, it is assumed that the information reproducing unit 38 is connected to the information reproducing terminal 68 by the cable 70. (S101).

A user operates the remote controller 29 to instruct the information reproducing unit 38 to record a received program (S102).

This operation is transmitted to the system control part 22 via the remote controller IF 27, the system control part 22 specifies a frequency to the digital tuner 12, and the demultiplexer 13 passes the PTS of a specified program to the bus 21 (S103).

The system control part 22 provides the HDD-IF 25 with an instruction of recording the specified PTS passing through the bus 21 on the HDD 26 (S104).

The system control part 22 provides the communication IF 31 with an instruction of issuing a command of sending record data, to which the information of the header part 81 such as the program ID 82 and the lapse of time of reproduction 84 (value is 0) is added, and the communication IF 31 sends the command of sending record data and the specified PTS to the information reproducing terminal 68 via the communication connector 32 and the cable 70 (S106).

Here, the command of sending record data is a command of sending a program file and has the information of the header part 81 such as program ID and the like added thereto. The communication IF 61 of the information reproducing terminal 68 receives the command of sending record data, to which the information of the header part 81 such as program ID and the like is added, and the specified PTS via the communication connector 62 (S107).

The system control part 52 instructs to write the information of the header part 81 such as program ID and the like and the specified PTS to the non-volatile memory 56 via the non-volatile memory 55 on the basis of the command of sending record data, the command being received by the communication IF 61 (S106).

When the broadcasting of the program is finished, the user instructs the information reproducing unit 38 to stop recording the received program by use of the remote controller 29 (S109).

The system control part 22 instructs the HDD-IF 25 to stop recording the received program (S111). At the same time, the system control part 22 instructs the communication IF 31 to issue a command of stopping sending record data to the information reproducing terminal 68, and the communication IF 31 sends the command of stopping sending record data to the information reproducing terminal 68 via the communication connector 32 and the cable 70 (S112).

The communication IF 61 of the information reproducing terminal 68 receives the command of stopping sending record data via the communication connector 62 (S113).

The system control part 52 instructs the non-volatile memory IF 55 to stop writing on the basis of the command of stopping sending record data that the communication IF 61 receives (S114).

Here, in order for the user to carry only the information reproducing terminal 68 while the user leaves home, the user disconnects the information reproducing terminal 68 from the information reproducing unit 38 (S116).

The user operates a reproducing key of the key 58 of the information reproducing terminal 68 to provide an instruction of reproducing the recorded program (S117).

The system control part 52 receives a list of recorded program information from the non-volatile memory 56 via the non-volatile memory IF 55 (S118).

The system control part 52 checks the lapse of time of reproduction 84 in the program file 80 and determines whether or not there is a program whose value of the lapse of time of reproduction 84 is other than 0 and which is under the suspension of reproduction (S119). If the system control part 52 determines that there is a program which is under the suspension of reproduction, the routine proceeds to S121 and if the system control part 52 determines that there is not a program which is under the suspension of reproduction, the routine proceeds to S122.

At S121, the system control part 52 passes a PTS starting from a point where the program was put into the suspension of reproduction of the program that is under the suspension of reproduction to the bus 51 and automatically starts reproducing the program from the point where the program was put into the suspension of reproduction (S121).

At S122, the system control part 52 passes a PTS starting from the start of the program recorded last to the bus 51 and reproduces the program recorded last from the start of the program (S122).

The demultiplexer 43 receives the specified PTS via the bus 51 and sends it to the AV decoder 44, the AV decoder 44 decodes video and audio, and the video is displayed on the display device 46 and the audio is reproduced by the speaker 49 (S123).

When the user wants to stop reproducing the program, the user operates a stop key of the key 58 of the information reproducing terminal 68 to provide an instruction of suspending the reproduction of the program (S125).

The system control part 52 writes the time that elapses until the reproduction is suspended to the lapse of time of reproduction 84 of the information of the header part 81 and stores the time as the program file 80 in the non-volatile memory 56 (S126).

When the user comes home, the user again connects the information reproducing unit 38 to the information reproducing terminal 68 by the cable 70 (S131).

The system control part 52 adds the header part 81 including the stored lapse of time of reproduction 84 to a resuming command and sends it from the communication IF 61 to the information reproducing unit 38 via the communication connector 62 (S132).

The system control part 22 specifies a program from among the program ID 82 of the header part 81 on the basis of the resuming command received by the communication IF 31, knows the lapse of time of reproduction from the lapse of time of reproduction 84, and instructs the HDD-IF 25 to read a PTS starting from specified time of a specified program from the HDD 26 (S133).

The HDD-IF 25 passes a PTS starting from the specified time of the specified program to the bus 21 (S134).

The demultiplexer 13 receives the specified PTS via the bus 21 and sends it to the AV decoder 14, the AV decoder 14 decodes video and audio, and the video is displayed on the display device 16 and the audio is reproduced by the speaker 19 (S136).

The operations described above are automatically performed, whereby the program that is viewed until midway by the information reproducing terminal 68 can be reproduced and displayed by the information reproducing unit 38 from a point where the reproducing of the program is suspended.

In this manner, in the first embodiment, in the case where the same program is reproduced by the information reproducing terminal 68 and the information reproducing unit 38 that are different from each other, the program can be viewed from the point where the reproduction of the program is suspended in one unit by sharing the lapse of time of reproduction between the units when the program is reproduced by one unit and then is reproduced by the other unit.

While the information reproducing unit 38 and the information reproducing terminal 68 are connected to each other by the cable 70, their connectors may be also connected directly to each other. Further, when both of the information reproducing unit 38 and the information reproducing terminal 68 have wireless functions, wireless communications may be used. Alternatively, if both of them have network functions, header information may be transmitted via network.

When the information reproducing unit 38 is connected to the information reproducing terminal 68, the program is recorded at the same time in the HDD 26 and the non-volatile memory 56. However, the program may be recorded only in the HDD 26 and may be transferred later to the non-volatile memory 56.

The information reproducing unit 38 and the information reproducing terminal 68 may record the same contents in different recording formats. For example, the recording format of the information reproducing unit 38 may be MPEG2 and the recording format of the information reproducing terminal 68 may be MPEG4.

The information reproducing unit 38 and the information reproducing terminal 68 may record the same contents at different bit rates. For example, the information reproducing unit 38 may record the contents at a higher bit rate than the information reproducing terminal 68.

Further, while the digital broadcast has been taken as an example, an analog broadcast can be also performed in the same way.

As for the storage device, the HDD is taken as an example of the information reproducing unit 38 and the non-volatile memory is taken as an example of the information reproducing terminal 68, but the HDD and the non-volatile memory may be used in reverse. An optical disk such as writable DVD may be used for them.

Second Embodiment

Figure 10A:
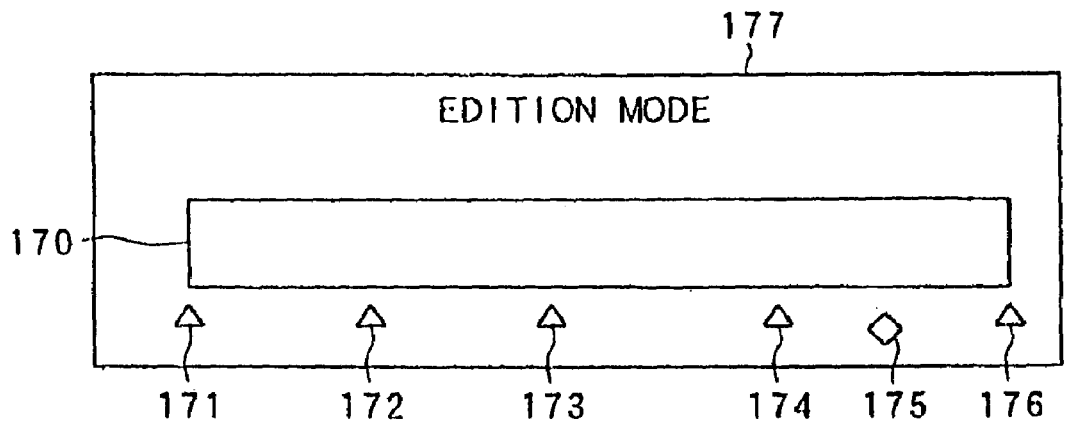
FIGS. 10A, 10B, and 10C are screen examples according to the second embodiment.
Figure 10B:
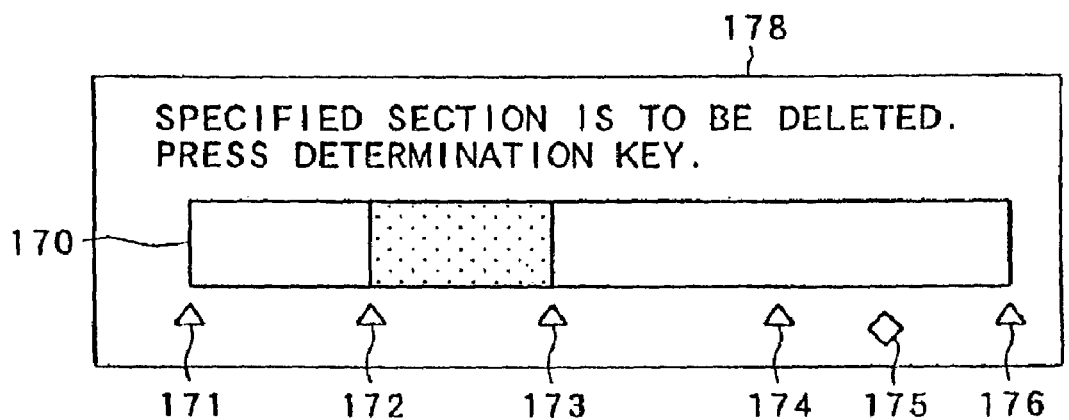

A second embodiment of the invention will be described by use of a flow chart shown in FIGS. 8 and 9 and a screen example shown in FIG. 10.

Figure 8:
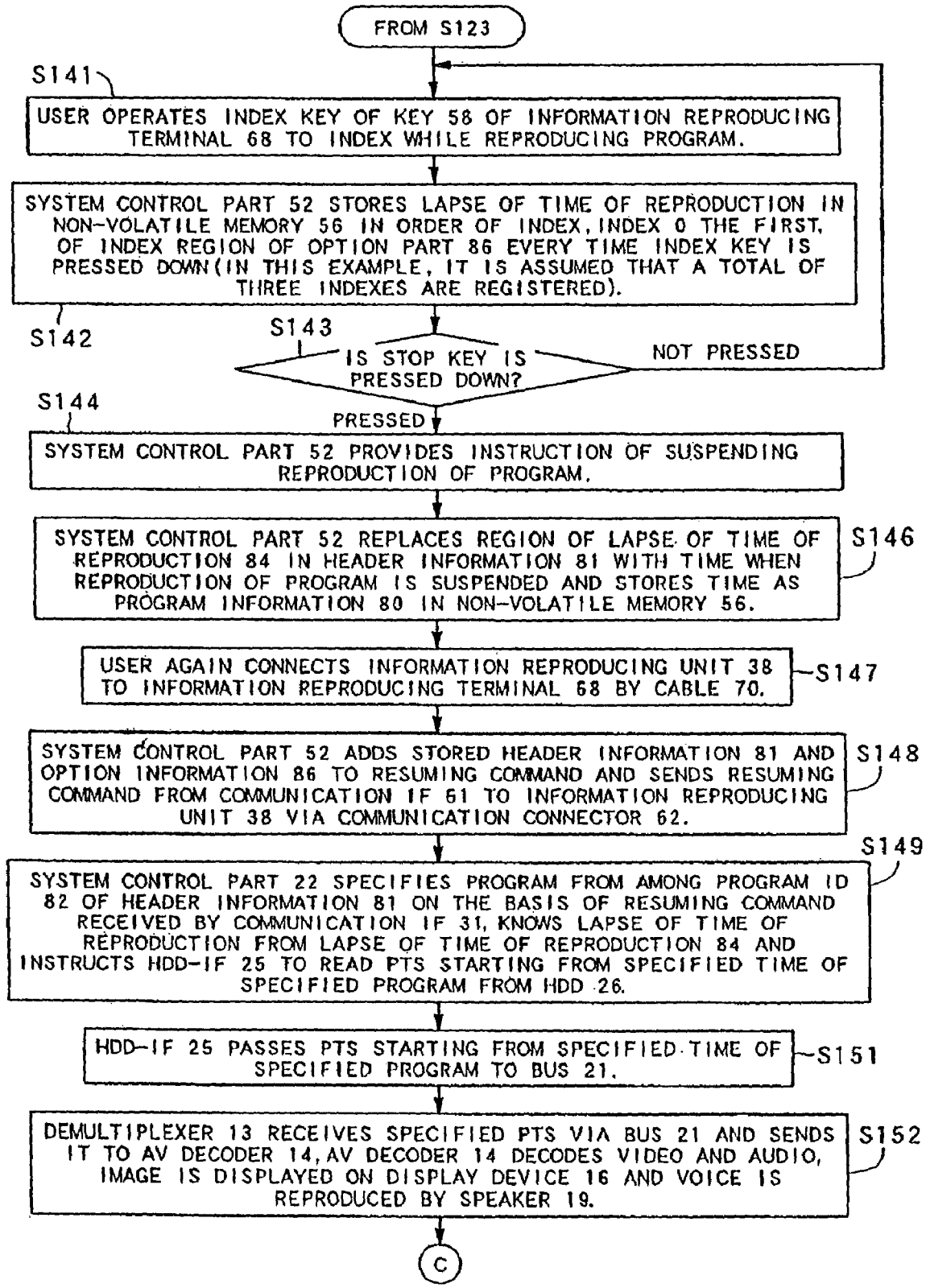
FIG. 8 is a flow chart according to a second embodiment of the invention.

In FIG. 8, the routine to a processing of viewing a reproduced screen by the information reproducing terminal 68 (S123 in FIG. 6) is the same as in the first embodiment and hence descriptions to this processing will be omitted. Here, the user operates an index key (not shown) of the key 58 of the information reproducing terminal 68 to index while reproducing the program (S141). While the user is reproducing the program, the user indexes at the points where the user wants to put marks such as the start and end of a region which the user wants to delete and the start and end of a region which the user wants to view again thoroughly on a large screen at home.

The system control part 22 stores the lapse of time of reproduction in the non-volatile memory 56 in the order of index, the index 0 the first, of the index region of the option part 86 every time the index key is pressed down (S142). It is assumed that sixteen index regions are prepared in the option part 86 and that indexes 0 to 15 can be specified. In this example, it is assumed that a total of three indexes are registered.

This processing is repeated until a stop key is pressed down to suspend the reproducing of the program (S143). When the stop key is pressed down, the system control part 52 provides an instruction of suspending the reproduction of the program (S144). The system control part 52 replaces the region of the lapse of time of reproduction 84 in the header part 81 with the time when the reproducing of the program is suspended and stores the time as the program file 80 in the non-volatile memory 56 (S146).

The user again connects the information reproducing unit 38 to the information reproducing terminal 68 by the cable 70 (S147). Then, the system control part 52 adds the stored header part 81 and the option part 86 to the resuming command and sends the command from the communication IF 61 to the information reproducing unit 38 via the communication connector 62 (S148).

The system control part 22 specifies a program from among the program ID 82 of the header part 81 on the basis of the resuming command received by the communication IF 31, knows the lapse of time of reproduction from the lapse of time of reproduction 84 and instructs the HDD-IF 25 to read PTS from the specified time of the specified program from the HDD 26 (S149). The HDD-IF 25 passes the PTS from the specified time of the specified program to the bus 21 (S151).

The demultiplexer 13 receives the specified PTS via the bus 21 and sends it to the AV decoder 14, the AV decoder 14 decodes video and audio, and the video is displayed on the display device 16 and the audio is reproduced by the speaker 19 (S152).

The user presses down an edition key (not shown) of the remote controller 29 (S153). The OSD 17 produces a screen shown in FIG. 10A and displays it on the display device 16 to inform the user of the reproducing unit being set in the edition mode (S154). Here, reference numeral 170 denotes the lapse of time of the specified program, 171 denotes a position of start of the program, 176 denotes a position of end of the program, 172 to 174 denote positions of indexes specified by the user, 175 denotes a midway position in reproduction, and 177 denotes a current state.

When the user operates a cursor (not shown) of the remote controller 29 to press down a determination key (not shown) at the position of index 172, the system control part 22 instructs the OSD 17 to change the color of a triangle of the index 172. Further, when the user operates the cursor to press down the determination key at the position of index 173, the system control part 22 instructs the OSD 17 to change the color of a triangle of the index 173 and the color of a region between the index 172 and the index 173. A message of "Specified section is to be deleted. Press down determination key" is displayed in 170 to inform the user of the deletion of the specified section by means of the screen shown in FIG. 10B (S156).

Figure 10C:
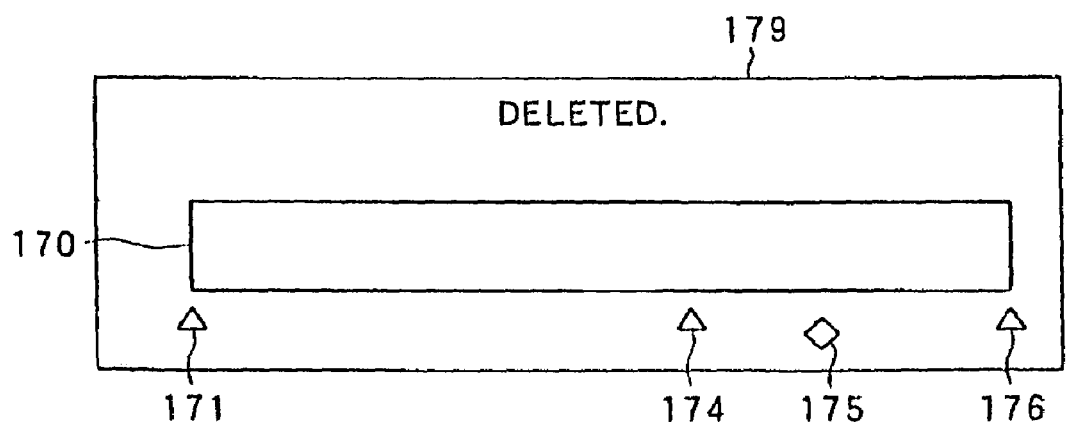

When the user presses the determination key, the OSD 17 produces a screen shown in FIG. 10C and displays the screen on the display device 16 to notify the user that the region between the index 172 and the index 173 is deleted (S157). When the user presses the edition key of the remote controller 29, the system control part 22 finishes the edition mode and starts reproducing the program again (S158).

In this manner, in the second embodiment, in the case where the same program is reproduced and edited by the information reproducing unit 38 and the information reproducing terminal 68 that are different from each other, when the same program is indexed at the time of reproducing the program by one unit and is edited by the other unit on the basis of the index, the program can be edited with ease by sharing the index between the units.

Third Embodiment

A third embodiment of the invention will be described by use of a flow chart shown in FIG. 11 and a screen example shown in FIG. 12.

In FIG. 11, the routine to a processing of stopping reproducing the program by the information reproducing terminal 68 (S126 in FIG. 6) is the same as in the first embodiment and hence descriptions of this processing will be omitted.

Figure 12:
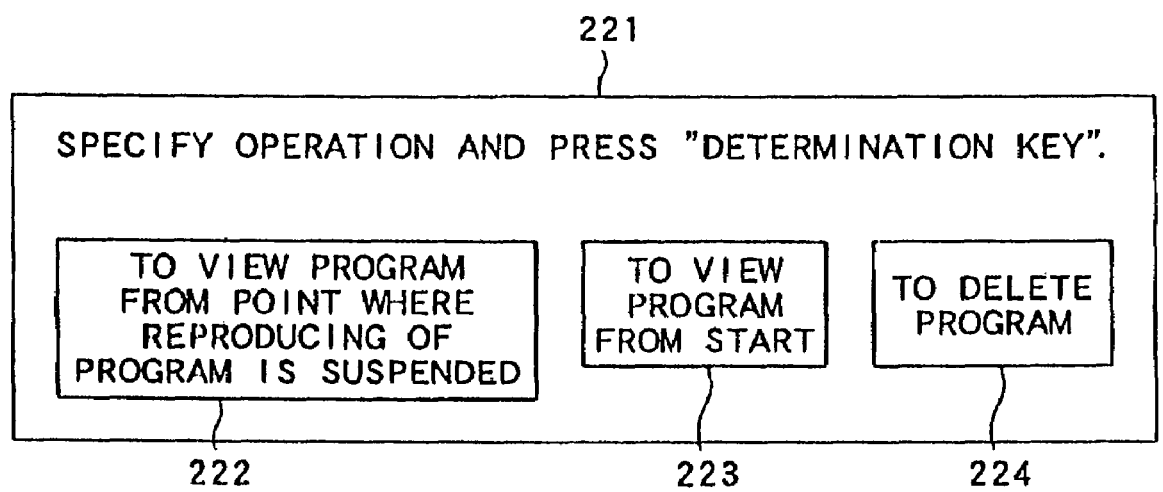
FIG. 12 is a screen example according to the third embodiment.

Here, the OSD 17 produces a screen as shown in FIG. 12 and displays the screen on the display device 16 to urge the user to specify an operation (S201). Here, a message of urging the user to specify an operation is displayed in 221 and the user selects any one of operations shown in 222 to 224.

The user operates the cursor key and determination key (not shown) of the key 58 of the information reproducing terminal 68 to specify one operation from among "to view program from point where reproducing of program is suspended", "to view program from start", and "to delete program" (S202). The system control part 52 defines the specified operation as the operation specification 85 of the header part 81 and stores it in the non-volatile memory 56 (S203).

The user again connects the information reproducing unit 38 to the information reproducing terminal 68 by the cable 70 (S204). The system control part 52 adds the stored header part 81 to the resuming command and sends it from the communication IF 61 to the information reproducing unit 38 via the communication connector 62 (S206).

The system control part 22 specifies a program from the program ID 82 of the header part 81 on the basis of the resuming command received by the communication IF 31, and knows the lapse of time of reproduction from the lapse of time of reproduction 84 and the operation from the operation specification 85 (S207). The system control part 22 determines the operation by the operation specification 85 (S208). If the operation is "to view program from point where reproducing of program is suspended", the routine proceeds to step S209. If the operation is "to view program from start", the routine proceeds to S211. If the operation is "to delete program", the routine proceeds to S212.

At S209, the system control part 22 instructs the HDD-IF 25 to read from the HDD 26 a PTS starting from the specified time of the specified program that is read from the header part 81 (S209). The HDD-IF 25 passes the PTS to the bus 21 (S213). The demultiplexer 13 receives the specified PTS via the bus 21 and send it to the AV decoder 14, the AV decoder 14 decodes video and audio, and the video is displayed on the display device 16 and the audio is reproduced by the speaker 19 (S216).

At S211, the system control part 22 instructs the HDD-IF 25 to read from the HDD 26 a PTS starting from the start of the specified program that is read from the header part 81 (S211) and the routine proceeds to S213.

At S212, the system control part 22 instructs the HDD-IF 25 to delete from the HDD 26 the program file of the specified program that is read from the header part 81 (S212). The HDD-IF 25 deletes the program file of the specified program from the HDD 26 (S214) according to this instruction.

In the third embodiment, in the case where the same program is reproduced by the information reproducing unit 38 and the information reproducing terminal 68 that are different from each other, when an operation is specified at the time of reproducing the program by one unit and then the program is reproduced by the other unit, the program can be automatically reproduced by sharing the specified operation between the units.

As described above, in the first to third embodiments, examples have been shown in which the information reproducing terminal does not have a digital tuner, but construction can be also used in which an information reproducing terminal has a digital tuner. With this construction, information can be recorded directly in the information reproducing terminal even if a command of sending record data and the PTS of a specified program are not transmitted from the information reproducing unit to the information reproducing terminal.

Further, a device that supplies a computer in a unit or a system connected to various kinds of devices with a program code of software for realizing the functions of the embodiments described above in such a way as to operate the devices to realize the functions described in the embodiments and operates the various kinds of devices according to programs stored in the computer (CPU or MPU) of the system or the unit to perform the functions is also included within the scope of the invention.

Still further, in this case, the program code itself of the above-described software realizes the functions of the above embodiments. Hence, the program code itself and means for supplying the program code to the computer, for example, a recording medium having the program code stored therein construct the invention. As the recording medium for storing the program code can be used, for example, flexible disks, hard disks, optical disks, magneto-optical disks, CD-ROMs, magnetic tapes, non-volatile memory cards, and ROMs.

Still further, not only when the program code supplied to the computer is executed by the computer to realize the functions of the above embodiments but also when the program code is executed in cooperation with an OS (Operating System) or other application software operating in the computer to realize the functions of the above embodiments, needless to say, the program code is included within the embodiment of the invention.

Moreover, also when the supplied program code is stored in a function expanding board of a computer or in a memory provided in a function expanding unit connected to a computer and then a CPU and the like provided in the function expanding board or the function expanding unit executes a part or all of actual processings on the basis of the instruction of the program code to realize the functions of the above embodiments, needless to say, the program code is included within the scope of the invention.

This application claims priority from Japanese Patent Application No. 2004-026648 filed Feb. 3, 2004, which is hereby incorporated by reference herein.

What is claimed is:

1. A broadcast receiving and reproducing system comprising:
   a first broadcast program reproducing device; and
   a second broadcast program reproducing device,
   wherein the first broadcast program reproducing device and the second broadcast program reproducing device are able to conduct communications with each other,
   wherein the first broadcast program reproducing device comprises:
   (a) a designation unit that designates an operation performed when the second broadcast program reproducing device reproduces a broadcast program;
   (b) a storage unit that stores broadcast program identification information which identifies the broadcast program and operation specification information which specifies the designated operation so that they are associated with each other; and
   (c) a sending unit that sends the broadcast program identification information and the operation specification information to the second broadcast program reproducing device, the operation specification information and the broadcast program identification information being associated with each other and stored in the storage unit, and
   wherein the second broadcast program reproducing device comprises:
   (a) a broadcast receiving unit that receives a broadcast wave;
   (b) a recording unit that records the broadcast program;
   (c) a receiving unit that receives the broadcast program identification information and the operation specification information which is associated with the broadcast program identification information, the broadcast program identification information and the operation specification information being sent by the sending unit;
   (d) an obtaining unit that obtains the broadcast program identified by the broadcast program identification information from the recording unit, the broadcast program identification information being received by the receiving unit; and
   (e) a reproducing unit that reproduces the broadcast program obtained by the obtaining unit, according to the operation specification information which is associated with the broadcast program identification information received by the receiving unit.

2. A method of controlling a broadcast receiving and reproducing system which comprises a first broadcast program reproducing device and a second broadcast program reproducing device, the first broadcast program reproducing device and the second broadcast program reproducing device being capable of conducting communications with each other, the method comprising the steps of:
   (A) making the first broadcast program reproducing device perform:
   (1) an accepting step of accepting designation of an operation performed when the second broadcast program reproducing device reproduces a broadcast program, from a user,
   (2) a storing step of storing broadcast program identification information which identifies the broadcast program and operation specification information which specifies the designated operation in a storage part so that they are associated with each other, and
   (3) a sending step of sending the broadcast program identification information and the operation specification information to the second broadcast program reproducing device, the operation specification information and the broadcast program identification information being associated with each other and stored in the storage part; and
   (B) making the second broadcast program reproducing device perform:
   (1) a broadcast receiving step of receiving a broadcast wave,
   (2) a recording step of recording the broadcast program in a recording part,
   (3) a receiving step of receiving the broadcast program identification information and the operation specification information which is associated with the broadcast program identification information, the broadcast program identification information and the operation specification information being sent in the sending step,
   (4) an obtaining step of obtaining the broadcast program identified by the broadcast program identification information from the recording part, the broadcast program identification information being received in the receiving step, and
   (5) a reproducing step of reproducing the broadcast program obtained in the obtaining step, according to the operation specification information which is associated with the broadcast program identification information received in the receiving step.

3. A broadcast receiving and reproducing system comprising:
   a first broadcast program reproducing device; and
   a second broadcast program reproducing device,
   wherein the first broadcast program reproducing device and the second broadcast program reproducing device are able to conduct communications with each other,
   wherein the first broadcast program reproducing device comprises:
   (a) a first receiving unit that receives video data of a broadcast program transmitted from the second broadcast program reproducing device;
   (b) a program storage unit that stores the video data received by the first receiving unit as a broadcast program file;
   (c) a first reproducing unit that reproduces the broadcast program file stored by the program storage unit;
   (d) an information storage unit that stores broadcast program identification information which identifies the broadcast program and time information which represents a time when the reproduced broadcast program is stopped so that they are associated with each other; and
   (e) a sending unit that sends the broadcast program identification information and the time information to the second broadcast program reproducing device when the second broadcast program reproducing device and the first broadcast program reproducing device are connected to each other, and wherein the second broadcast program reproducing device comprises:

(a) a broadcast receiving unit that receives a broadcast wave;

(b) a recording unit that records the broadcast program;

(c) a second receiving unit that receives the broadcast program identification information and the time information, the broadcast program identification information and the time information being sent by the sending unit;

(d) an obtaining unit that obtains the broadcast program identified by the broadcast program identification information from the recording unit; and (e) a second reproducing unit that reproduces the broadcast program obtained by the obtaining unit from a point at which the reproducing of the broadcast program is stopped in the first broadcast program reproducing device, according to the time information which is associated with the broadcast program identification information received by the second receiving unit.

4. A method of controlling a broadcast receiving and reproducing system which comprises a first broadcast program reproducing device and a second broadcast program reproducing device, the first broadcast program reproducing device and the second broadcast program reproducing device being capable of conducting communications with each other, the method comprising the steps of:

(A) making the first broadcast program reproducing device perform the steps of:

(1) receiving video data of a broadcast program transmitted from the second broadcast program reproducing device;

(2) storing the received video data in a program storage part as a broadcast program file;

(3) reproducing the broadcast program file stored in the program storage part;

(4) storing broadcast program identification information which identifies the broadcast program and time information which represents a time when the reproduced broadcast program is stopped, on an information storage part so that they are associated with each other; and (5) sending the broadcast program identification information and the time information to the second broadcast program reproducing device when the second broadcast program reproducing device and the first broadcast program reproducing device are connected to each other; and (B) making the second broadcast program reproducing device perform the steps of:

(1) receiving a broadcast wave;

(2) recording the broadcast program in a recording part;

(3) receiving the broadcast program identification information and the time information, the broadcast program identification information and the time information being sent by the sending step;

(4) obtaining the broadcast program identified by the broadcast program identification information from the recording part; and (5) reproducing the obtained broadcast program from a point which the reproducing of the broadcast program is stopped in the first broadcast program reproducing device, according to the time information which is associated with the received broadcast program identification information.

5. A broadcast receiving and reproducing system comprising:

a first broadcast program reproducing device; and a second broadcast program reproducing device, wherein the first broadcast program reproducing device and the second broadcast program reproducing device are able to conduct communications with each other, wherein the first broadcast program reproducing device comprises:

(a) a first receiving unit that receives video data of a broadcast program transmitted from the second broadcast program reproducing device;

(b) a program storage unit that stores the video data received by the first receiving unit as a broadcast program file;

(c) a reproducing unit that reproduces the broadcast program file stored by the program storage unit;

(d) a designation unit that designates at least an index to the broadcast program while reproducing the video data of the broadcast program file;

(e) an information storage unit that stores broadcast program identification information which identifies the broadcast program and time information which represents a time of the index designated by the designation unit so that they are associated with each other; and (f) a sending unit that sends the broadcast program identification information and the time information to the second broadcast program reproducing device when the second broadcast program reproducing device and the first broadcast program reproducing device are connected to each other, and wherein the second broadcast program reproducing device comprises:

(a) a broadcast receiving unit that receives a broadcast wave;

(b) a recording unit that records the broadcast program;

(c) a second receiving unit that receives the broadcast program identification information and the time information, the broadcast program identification information and the time information being sent by the sending unit;

(d) an obtaining unit that obtains the broadcast program identified by the broadcast program identification information from the recording unit; and (e) an application unit that applies the index based on the time information received by the second receiving unit as an index of the broadcast program obtained by the obtaining unit.

6. A method of controlling a broadcast receiving and reproducing system which comprises a first broadcast program reproducing device and a second broadcast program reproducing device, the first broadcast program reproducing device and the second broadcast program reproducing device being capable of conducting communications with each other, the method comprising the steps of:

(A) making the first broadcast program reproducing device perform the steps of:

(1) receiving video data of a broadcast program transmitted from the second broadcast program reproducing device;

(2) storing the received video data in a program storage part as a broadcast program file;

(3) reproducing the broadcast program file stored in the program storage part;

(4) accepting, from a user, the designation of at least an index to the broadcast program while reproducing the video data of the broadcast program file;

(5) storing broadcast program identification information which identifies the broadcast program and time information which represents time of the designated index, in an information storage part so that they are associated with each other; and (6) sending the broadcast program identification information and the time information to the second broadcast program reproducing device when the second broadcast program reproducing device and the first broadcast program reproducing device are connected to each other, and (B) making the second broadcast program reproducing device perform the steps of:

(1) receiving a broadcast wave;

(2) recording the broadcast program in a recording part;

(3) receiving the broadcast program identification information and the time information, the broadcast program identification information and the time information being sent from the first broadcast program reproducing device;

(4) obtaining the broadcast program identified by the broadcast program identification information from the recording part; and (5) applying the index based on the received time information as an index of the obtained broadcast program.

* * * * *